United States Patent
Tadakuma et al.

(10) Patent No.: US 11,519,759 B2
(45) Date of Patent: Dec. 6, 2022

(54) CABLE, CABLE SHAPE SENSING SYSTEM, SENSING SYSTEM, AND CABLE SHAPE SENSING METHOD

(71) Applicant: FURUKAWA ELECTRIC CO., LTD., Tokyo (JP)

(72) Inventors: Masateru Tadakuma, Tokyo (JP); Shigehiro Takasaka, Tokyo (JP); Ryuichi Sugizaki, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 17/136,446

(22) Filed: Dec. 29, 2020

(65) Prior Publication Data

US 2021/0116265 A1   Apr. 22, 2021

Related U.S. Application Data

(63) Continuation of application No. PCT/JP2019/030073, filed on Jul. 31, 2019.

(30) Foreign Application Priority Data

Jul. 31, 2018   (JP) .............................. JP2018-144389

(51) Int. Cl.
  *G02B 6/02* (2006.01)
  *G01D 5/353* (2006.01)
  *G01B 11/16* (2006.01)

(52) U.S. Cl.
  CPC ....... *G01D 5/35303* (2013.01); *G01B 11/165* (2013.01); *G02B 6/02042* (2013.01)

(58) Field of Classification Search
  CPC ........... G01D 5/35303; G01D 5/35316; G01D 5/35361; G01D 5/35364; G01D 5/3538;
  (Continued)

(56) References Cited

U.S. PATENT DOCUMENTS 7,781,724 B2   8/2010 Childers et al.
7,813,599 B2 * 10/2010 Moore ................... G01B 11/18
                                                          385/12
(Continued)

FOREIGN PATENT DOCUMENTS

EP   2 478 527 A1   7/2012
EP   2 666 001 A1   11/2013
(Continued)

OTHER PUBLICATIONS

International Search Report dated Sep. 10, 2019 in PCT/JP2019/030073 filed on Jul. 31, 2019, 2 pages.

(Continued)

*Primary Examiner* — John Bedtelyon
(74) *Attorney, Agent, or Firm* — Oblon, McClelland, Maier & Neustadt, L.L.P.

(57) ABSTRACT

A cable comprising: a plurality of optical fiber cores; and one or more optical fiber core wires including one or more of the optical fiber cores. Further, at least one of the optical fiber core wire is fixed at a plurality of positions in a longitudinal direction of the cable so as to achieve substantially no displacement in a cable radial direction, at least a pair of the optical fiber core wires are fixed in a plane perpendicular to the longitudinal direction of the cable so as to achieve substantially no displacement relative to each other, and sensing of a strain profile in the longitudinal direction of at least the pair of the optical fiber core wires leads to achievement of sensing of a shape of the cable in the longitudinal direction.

24 Claims, 9 Drawing Sheets

(58) Field of Classification Search
CPC ..... G01B 11/165; G01B 11/161; G01B 11/18; G02B 6/02042; G02B 6/4409; G02B 6/4416; G02B 6/4432; H01B 11/22
See application file for complete search history.

(56) References Cited

U.S. PATENT DOCUMENTS

| | | | |
|---|---|---|---|
| 8,240,119 B2 | 8/2012 | Fujimoto et al. | |
| 8,746,076 B2 * | 6/2014 | Rogge | G01L 1/246 385/12 |
| 8,970,845 B1 * | 3/2015 | Chan | G01B 11/18 356/478 |
| 9,766,396 B2 | 9/2017 | Kremp et al. | |
| 9,829,352 B2 | 11/2017 | Xue et al. | |
| 10,194,831 B2 * | 2/2019 | Chan | A61B 8/4263 |
| 10,612,911 B1 * | 4/2020 | Pena, III | G01B 11/161 |
| 2006/0072886 A1 | 4/2006 | Kim et al. | |
| 2010/0277329 A1 | 11/2010 | Worzyk | |
| 2010/0326038 A1 | 12/2010 | Fujimoto et al. | |
| 2014/0218716 A1 | 8/2014 | Brown et al. | |
| 2016/0225489 A1 | 8/2016 | Willemoës | |
| 2018/0023948 A1 | 1/2018 | Bennett et al. | |

FOREIGN PATENT DOCUMENTS

| | | |
|---|---|---|
| EP | 3 164 688 A1 | 5/2017 |
| EP | 3 928 308 A1 | 12/2021 |
| JP | 04-147105 A | 5/1992 |
| JP | 2001-208915 A | 8/2001 |
| JP | 2013-036876 A | 2/2013 |
| JP | 2017-032979 A | 2/2017 |
| KR | 10-2011-0006881 A | 1/2011 |
| WO | WO 2009/104633 A1 | 8/2009 |
| WO | WO 2011/142642 A2 | 11/2011 |
| WO | WO 2014/027592 A1 | 2/2014 |
| WO | WO 2017/134360 A1 | 8/2017 |

OTHER PUBLICATIONS

Moore, "Shape Sensing Using Multi-core Fiber", Proceedings of Optical Fiber Communication Conference, 2015, Th1 C.2., 3 pages.
Moore, et al., "Shape sensing using multi-core fiber optic cable and parametric curve solutions", Optics Express, vol. 20, No. 3, 2012, pp. 2967-2973.
Westbrook et al., "Continuous Multicore Optical Fiber Grating Arrays for Distributed Sensing Applications", Journal of Lightwave Technology, vol. 35, No. 6, Mar. 15, 2017, pp. 1248-1252.
Extended European Search Report dated Apr. 8, 2022, in the corresponding European Application No. 19844627.0, 15 pages.
Combined Chinese Office Action and Search Report dated Apr. 21, 2022 in Chinese Patent Application No. 201980050235.2 (with unedited computer generated English translation), 23 pages.
Chinese Office Action dated Sep. 14, 2022 in corresponding Chinese Application No. 201980050235.2, with English machine translation thereof, 16 pages.

* cited by examiner

CABLE, CABLE SHAPE SENSING SYSTEM, SENSING SYSTEM, AND CABLE SHAPE SENSING METHOD

CROSS-REFERENCE TO RELATED APPLICATION(S)

This application is a continuation of International Application No. PCT/JP2019/030073, filed on Jul. 31, 2019 which claims the benefit of priority of the prior Japanese Patent Application No. 2018-144389, filed on Jul. 31, 2018, the entire contents of which are incorporated herein by reference.

BACKGROUND

The present disclosure relates to a cable, a cable shape sensing system, a sensing system including the cable shape sensing system, and a cable shape sensing method.

In the related art, an optical fiber has been used to sense various physical quantities (refer to Japanese Laid-Open Patent Publication No. 2017-032979). Furthermore, there have been disclosed techniques, in recent years, that senses the shape of a multi-core optical fiber in a longitudinal direction by sensing local bending in the longitudinal direction of the multi-core optical fiber (refer to J. P. Moore, "Shape sensing using multi-core fiber", in Proc. Opt. Fiber Commun. Conf., 2015, p.Th1C.2; J. P. Moore and M. D. Rogge, "Shape sensing using multi-core fiber optic cable and parametric curve solutions", Opt. Express, vol. 20, no. 3, pp. 2967-2973, 2012; and Paul S. Westbrook, Tristan Kremp, Kenneth S. Feder, Wing Ko, Eric. M. Monberg, Hongchao Wu, Debra A. Simoff, Thierry F. Taunay, and Roy M. Ortiz, "Continuous Multicore Optical Fiber Grating Arrays for Distributed Sensing Applications" J. Lightw. Technol., vol. 35, no. 6, pp. 1248-1252, March 2017).

SUMMARY

There is a need for providing a cable capable of sensing the shape in the longitudinal direction, a cable shape sensing system, a sensing system having the cable shape sensing system, and a cable shape sensing method.
Solution to Problem According to an embodiment, a cable includes: a plurality of optical fiber cores; and one or more optical fiber core wires including one or more of the optical fiber cores. Further, at least one of the optical fiber core wires is fixed at a plurality of positions in a longitudinal direction of the cable so as to achieve substantially no displacement in a cable radial direction, at least a pair of the optical fiber core wires are fixed in a plane perpendicular to the longitudinal direction of the cable so as to achieve substantially no displacement relative to each other, and sensing of a strain profile in the longitudinal direction of at least the pair of the optical fiber core wires leads to achievement of sensing of a shape of the cable in the longitudinal direction.

DESCRIPTION OF EMBODIMENT

Figure 1:
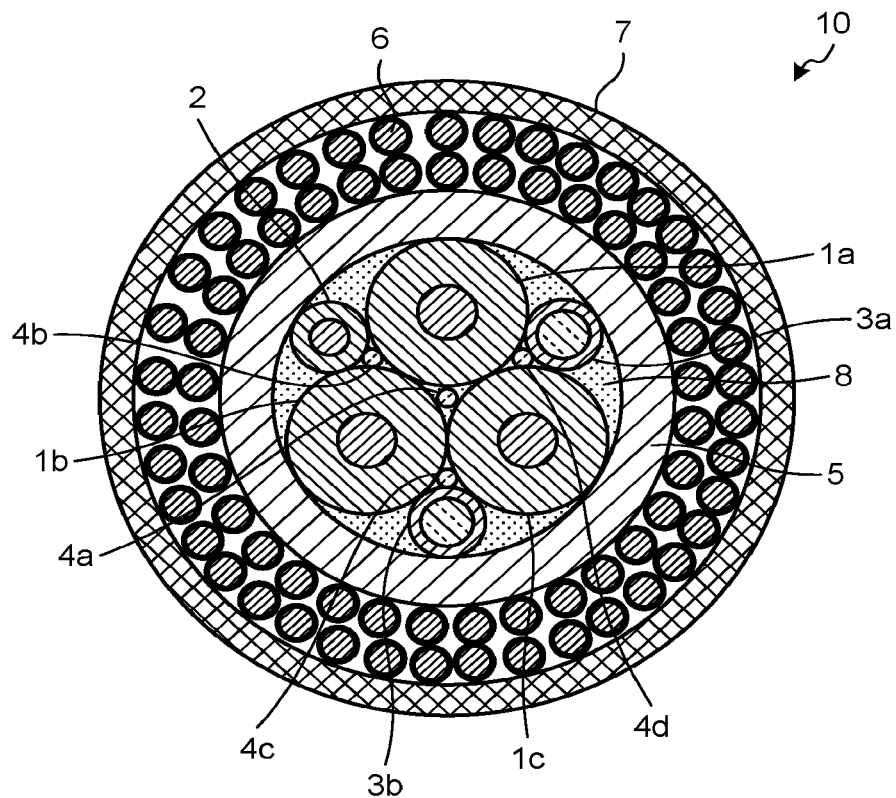
FIG. 1 is a schematic cross-sectional view of a cable according to a first embodiment.

In the related art, there are various types of cables, such as power cables including power lines as transmission lines, communication cables including communication lines such as optical fibers and metal lines as transmission lines, and composite cables including optical fibers and power lines. Sensing the shapes of these cables is important. In a communication cable, for example, the shape of the cable sometimes changes due to the influence of the surrounding environment during installation or after installation, and the change in the shape might affect the optical transmission characteristics of an internal optical fiber line. Changes in the shape of the cable might also cause damage or breakage of the cable in some cases. The demand for capabilities of sensing the shape of a cable is increasing with the diversification of the type and usage of the cable. On the other hand, in ordinary cables, the position of the structural material inside the cable also changes in the radial direction of the cable in accordance with the change in the longitudinal direction. Therefore, high-accuracy cable shape sensing would be difficult simply by introducing an optical fiber (core).

Hereinafter, embodiments of the present disclosure will be described in detail with reference to the accompanying drawings. The present disclosure is not limited to the embodiments described below. Furthermore, the same or corresponding elements are appropriately assigned the same reference numerals in the description of the drawings.

First Embodiment

FIG. 1 is a schematic cross-sectional view of a surface of a cable according to a first embodiment, perpendicular to a longitudinal direction of the cable. A cable 10 is a composite cable having a circular cross section, and includes power lines 1a, 1b and 1c which are transmission lines for transmitting electric power, a ground line 2, and optical fiber lines 3a and 3b which are communication lines for transmitting optical signals, sensor optical fibers 4a, 4b, 4c, and 4d, an inner coating layer 5, a plurality of tension members 6, an outer coating layer 7, and a filler 8. The power lines 1a, 1b, and 1*c*, the ground line 2, the optical fiber lines 3*a* and 3*b*, the inner coating layer 5, the tension member 6, the outer coating layer 7, and the filler 8 are structural materials constituting the structure of the cable 10. The sensor optical fibers 4*a*, 4*b*, 4*c*, and 4*d* are examples of optical fiber core wires.

The power lines 1*a*, 1*b*, and 1*c* and the ground line 2 each include: a stranded wire formed of a conductor; and an insulating coating formed of resin or the like that covers an outer circumference of the stranded wire. The three power lines 1*a*, 1*b*, and 1*c* are spirally twisted in the longitudinal direction. The optical fiber lines 3*a* and 3*b* are each formed of a glass optical fiber covered with resin or the like, which includes an optical fiber core and a cladding. The optical fiber lines 3*a* and 3*b* may each include a plurality of coated glass optical fibers.

The sensor optical fibers 4*a*, 4*b*, 4*c*, and 4*d* are also formed of glass optical fibers, which are composed of an optical fiber core and a cladding and are covered with a resin or the like. The sensor optical fibers 4*a*, 4*b*, 4*c* and 4*d* are each single-core optical fibers in each of which a glass optical fiber has a single core. In a plane perpendicular to the longitudinal direction, the sensor optical fibers 4*b*, 4*c*, and 4*d* are arranged such that their centers are equidistant from the center of the sensor optical fiber 4*a* and are equiangular about the sensor optical fiber 4*a*.

Figure 2:
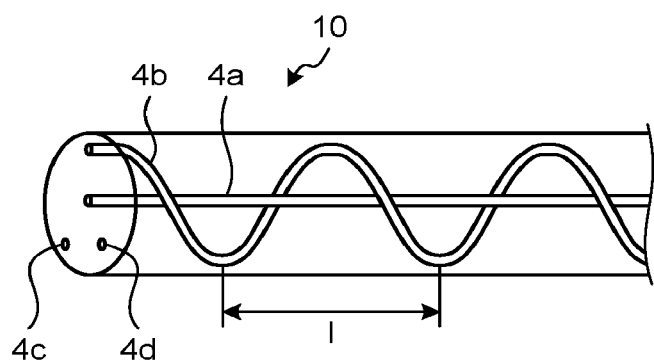
FIG. 2 is a schematic view illustrating a shape of a sensor optical fiber in the cable of FIG. 1.

FIG. 2 is a schematic view illustrating shapes of the sensor optical fibers 4*a*, 4*b*, 4*c*, and 4*d* in the cable 10. The sensor optical fiber 4*a* is arranged in the vicinity of a central axis of the cable 10 in the longitudinal direction. The vicinity of the central axis includes the central axis. The sensor optical fibers 4*b*, 4*c*, and 4*d* are spirally arranged around the central axis of the cable 10 in the longitudinal direction. For simplicity of illustration, FIG. 2 illustrates spiral arrangement only for the sensor optical fiber 4*b*. The spiral period of the sensor optical fiber 4*b* is 1. This implies that the spiral period is 1 for the sensor optical fibers 4*c* and 4*d* as well.

The distance between the center of each of the sensor optical fibers 4*b*, 4*c*, and 4*d* from the center of the sensor optical fiber 4*a* (or the central axis of the cable 10) and the spiral period are determined by the size of the entire cable 10 and the cable shape accuracy to be detected. For example, when the entire diameter of the cable 10 is 11.5 mm, the distance is set to 3 mm and the spiral period is set to 100 mm, for example. The longer the distance, the higher the accuracy of sensing the cable shape, and the shorter the spiral period, the higher the accuracy of sensing the cable shape.

The inner coating layer 5 is provided inside the cable 10. The inner coating layer 5 is formed of resin or the like, and is formed so as to surround an outer circumference of the power lines 1*a*, 1*b*, and 1*c*, the ground line 2, the optical fiber lines 3*a* and 3*b*, and the sensor optical fibers 4*a*, 4*b*, 4*c*, and 4*d*. A space inside the inner coating layer 5 is filled with a filler 8 such as silicon.

The plurality of tension members 6 is arranged on an outer circumference of the inner coating layer 5. Each of the tension members 6 is formed of steel wire, FRP or the like, and protects internal wires (mainly the power lines 1*a*, 1*b*, and 1*c* and the optical fiber lines 3*a* and 3*b*, which are transmission lines) from the external force applied to the cable 10. The outer coating layer 7 is a coating layer to form an outer circumference of the cable 10, and is a blade coating formed of a metal wire or the like in the present embodiment.

Here, the sensor optical fibers 4*a*, 4*b*, 4*c*, and 4*d* are fixed at a plurality of positions in the longitudinal direction of the cable 10 so as to achieve substantially no displacement in the radial direction of the cable 10. Here, "substantially no displacement" means no change in the distance from the cable center in the cross section of the cable 10. Specifically, the sensor optical fibers 4*a*, 4*b*, 4*c*, and 4*d* are fixed, by using the filler 8, to at least one of the structural materials such as the power lines 1*a*, 1*b*, and 1*c*, the ground line 2, and the optical fiber lines 3*a* and 3*b* in the longitudinal direction, in other words, at a plurality of positions in the longitudinal direction, so as to maintain the relative positional relationship. As a result, each of the optical fiber cores forming the sensor optical fibers 4*a*, 4*b*, 4*c*, and 4*d* is fixed so as to be strained in accordance with the strain of the structural material to which the fibers are to be fixed.

With this configuration, when the cable 10 is locally bent, the sensor optical fibers 4*a*, 4*b*, 4*c*, and 4*d* are also bent and distorted in accordance with the bending in the cable 10. As a result, a change occurs in the shape and a strain profile of the sensor optical fibers 4*a*, 4*b*, 4*c*, and 4*d* in the longitudinal direction in accordance with the change in the shape of the cable 10 in the longitudinal direction. Accordingly, sensing the strain profile in the longitudinal direction of the sensor optical fibers 4*a*, 4*b*, 4*c*, and 4*d* leads to achievement of sensing of the shape of the cable 10 in the longitudinal direction. Note that due to the arrangement of the sensor optical fiber 4*a* in the vicinity of the central axis of the cable 10, even when the cable 10 has a linear shape but is twisted about the central axis, the twisting can be suitably sensed.

As a method of sensing the shape of the optical fiber in the longitudinal direction, for example, the methods described in J. P. Moore, "Shape sensing using multi-core fiber", in Proc. Opt. Fiber Commun. Conf., 2015, p.Th1C.2, and J. P. Moore and M. D. Rogge, "Shape sensing using multi-core fiber optic cable and parametric curve solutions", Opt. Express, vol. 20, no. 3, pp. 2967-2973, 2012 can be applied. The shape sensing system of the cable 10 used for achieving sensing will be described in detail below.

Second Embodiment

Figure 3:
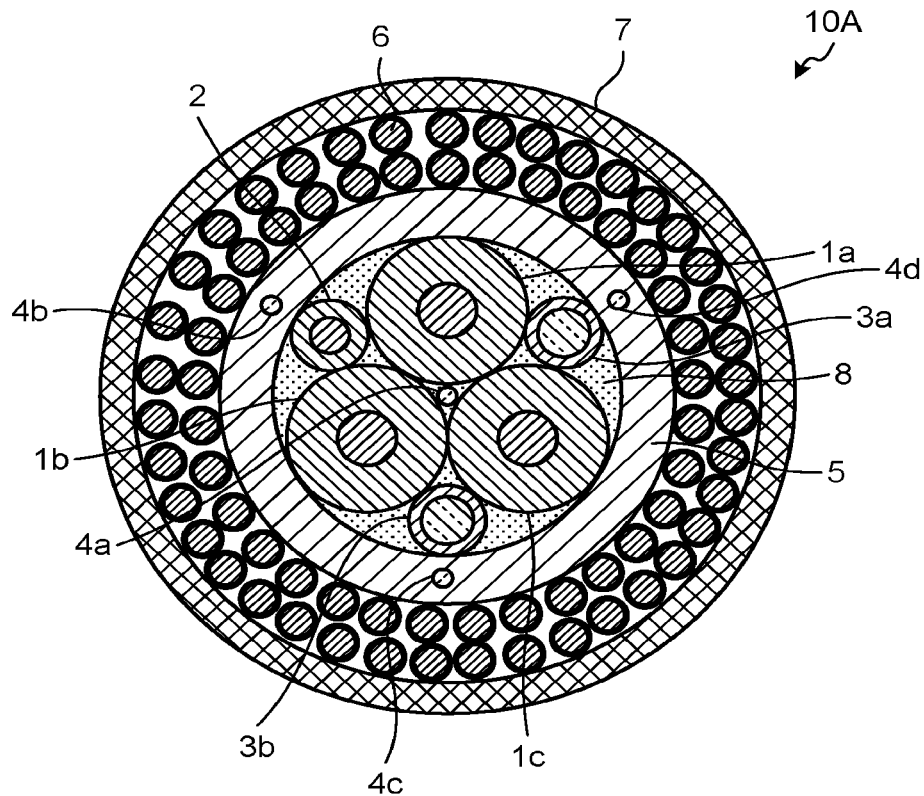
FIG. 3 is a schematic cross-sectional view of a cable according to a second embodiment.

FIG. 3 is a schematic cross-sectional view of a surface of a cable according to a second embodiment, perpendicular to a longitudinal direction of the cable. Having a circular cross section, and similarly to the cable 10 illustrated in FIG. 1, a cable 10A includes power lines 1*a*, 1*b* and 1*c*, a ground line 2, optical fiber lines 3*a* and 3*b*, and sensor optical fibers 4*a*, 4*b*, 4*c*, and 4*d*, an inner coating layer 5, a plurality of tension members 6, an outer coating layer 7, and a filler 8.

In the present embodiment, the sensor optical fibers 4*a*, 4*b*, 4*c*, and 4*d* are also fixed at a plurality of positions in the longitudinal direction of the cable 10A so as to achieve substantially no displacement in the radial direction of the cable 10A. However, the cable 10A is different from the cable 10 in the configuration in which the sensor optical fibers 4*b*, 4*c*, and 4*d* are arranged inside the inner coating layer 5 being a structure in the longitudinal direction and are fixed to the inner coating layer 5 so as to maintain the relative positional relationship. The configuration of the other components of the cable 10A is the same as that of the cable 10, and thus the description thereof will be omitted. In a plane perpendicular to the longitudinal direction, the sensor optical fibers 4*b*, 4*c*, and 4*d* are arranged such that their centers are equidistant from the center of the sensor optical fiber 4*a* and are equiangular about the sensor optical fiber 4*a*. In this cable 10A, sensing the strain profile in the longitudinal direction of the sensor optical fibers 4*a*, 4*b*, 4*c*, and 4d also leads to achievement of sensing of the shape of the cable 10A in the longitudinal direction.

Third Embodiment

Figure 4:
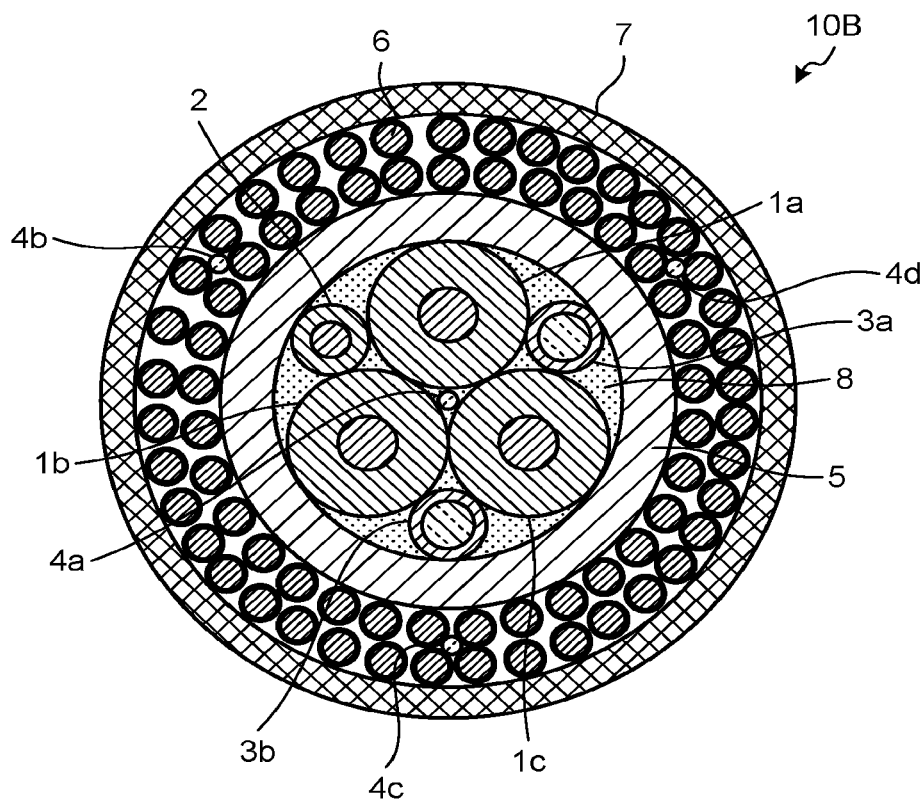
FIG. 4 is a schematic cross-sectional view of a cable according to a third embodiment.

FIG. 4 is a schematic cross-sectional view of a surface of a cable according to a third embodiment, perpendicular to a longitudinal direction of the cable. Having a circular cross section, and similarly to the cable 10 illustrated in FIG. 1, a cable 10B includes power lines 1a, 1b and 1c, a ground line 2, optical fiber lines 3a and 3b, and sensor optical fibers 4a, 4b, 4c, and 4d, an inner coating layer 5, a plurality of tension members 6, an outer coating layer 7, and a filler 8.

In the present embodiment, the sensor optical fibers 4a, 4b, 4c, and 4d are also fixed at a plurality of positions in the longitudinal direction of the cable 10B so as to achieve substantially no displacement in the radial direction of the cable 10B. However, the cable 10B is different from the cable 10 in the configuration in which the sensor optical fibers 4b, 4c, and 4d are arranged to be surrounded by the tension members 6 being structures in the longitudinal direction and are fixed to the tension members 6 so as to maintain the relative positional relationship. The configuration of the other components of the cable 10B is the same as that of the cable 10, and thus the description thereof will be omitted. In a plane perpendicular to the longitudinal direction, the sensor optical fibers 4b, 4c, and 4d are arranged such that their centers are equidistant from the center of the sensor optical fiber 4a and are equiangular about the sensor optical fiber 4a. In this cable 10B, sensing the strain profile in the longitudinal direction of the sensor optical fibers 4a, 4b, 4c, and 4d also leads to achievement of sensing of the shape of the cable 10B in the longitudinal direction.

Fourth Embodiment

Figure 5:
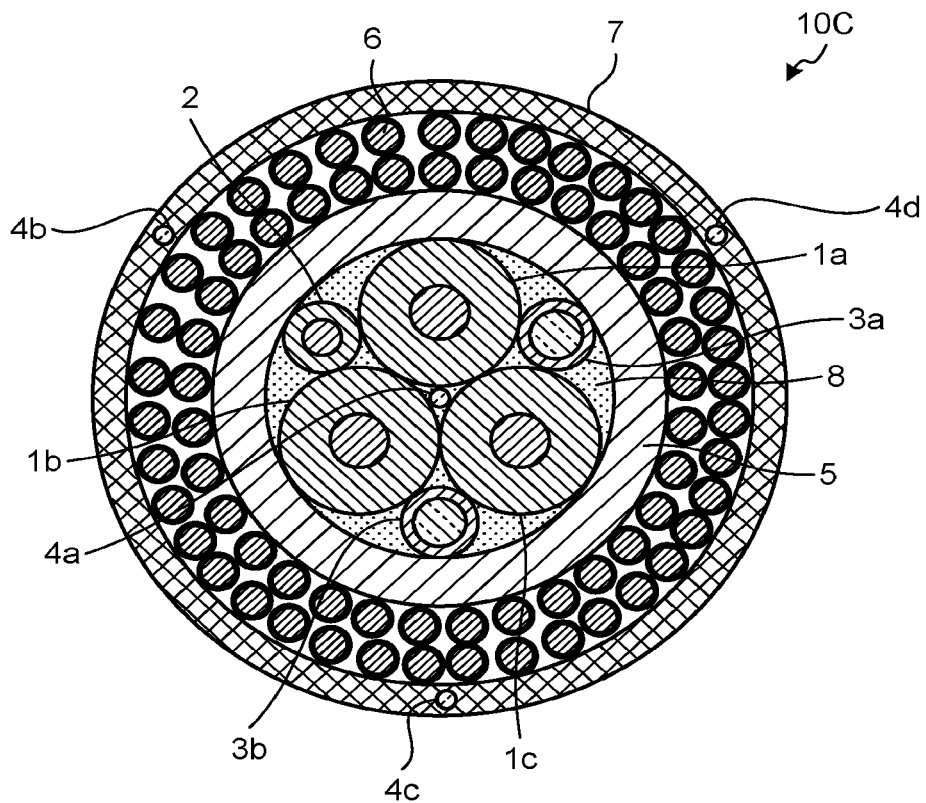
FIG. 5 is a schematic cross-sectional view of a cable according to a fourth embodiment.

FIG. 5 is a schematic cross-sectional view of a surface of a cable according to a fourth embodiment, perpendicular to a longitudinal direction of the cable. Having a circular cross section, and similarly to the cable 10 illustrated in FIG. 1, a cable 10C includes power lines 1a, 1b and 1c, a ground line 2, optical fiber lines 3a and 3b, and sensor optical fibers 4a, 4b, 4c, and 4d, an inner coating layer 5, a plurality of tension members 6, an outer coating layer 7, and a filler 8.

In the present embodiment, the sensor optical fibers 4a, 4b, 4c, and 4d are also fixed at a plurality of positions in the longitudinal direction of the cable 10C so as to achieve substantially no displacement in the radial direction of the cable 10C. However, the cable 10C is different from the cable 10 in the configuration in which the sensor optical fibers 4b, 4c, and 4d are arranged inside the outer coating layer 7 being a structure in the longitudinal direction and are fixed to the outer coating layer 7 so as to maintain the relative positional relationship. The configuration of the other components of the cable 10C is the same as that of the cable 10, and thus the description thereof will be omitted. Furthermore, in a plane perpendicular to the longitudinal direction, the sensor optical fibers 4b, 4c, and 4d are arranged such that their centers are equidistant from the center of the sensor optical fiber 4a and are equiangular about the sensor optical fiber 4a. In this cable 10C, sensing the strain profile in the longitudinal direction of the sensor optical fibers 4a, 4b, 4c, and 4d also leads to achievement of sensing of the shape of the cable 10C in the longitudinal direction.

Fifth Embodiment

Figure 6:
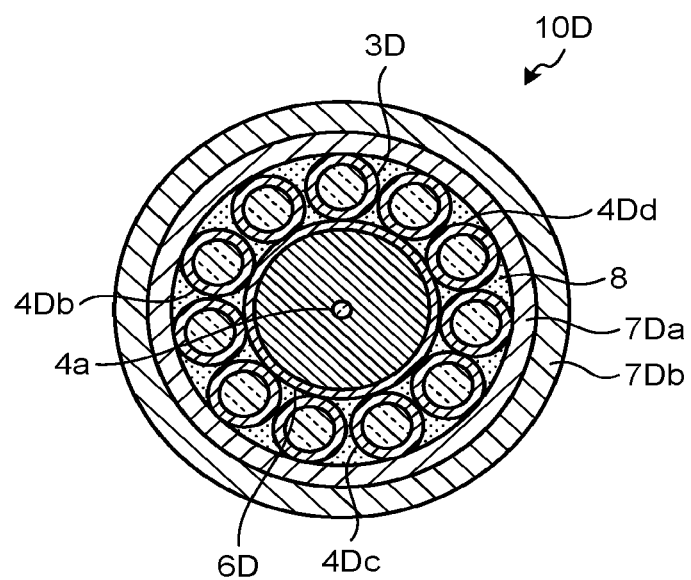
FIG. 6 is a schematic cross-sectional view of a cable according to a fifth embodiment.

FIG. 6 is a schematic cross-sectional view of a surface of a cable according to a fifth embodiment, perpendicular to a longitudinal direction of the cable. As a communication cable having a circular cross section, a cable 10D includes a plurality of optical fiber lines 3D as transmission lines for transmitting optical signals, sensor optical fibers 4a, 4Db, 4Dc, and 4Dd, a tension member 6D, outer coating layers 7Da and 7Db, and a filler 8. The plurality of optical fiber lines 3D, the tension member 6D, the outer coating layers 7Da and 7Db, and the filler 8 are structural materials constituting the structure of the cable 10D. The sensor optical fibers 4Db, 4Dc, 4Dd are examples of optical fiber core wires.

The tension member 6D is arranged in the vicinity of the central axis of the cable 10D in the longitudinal direction. The sensor optical fiber 4a is inserted and fixed in a through hole formed in the vicinity of the central axis of the tension member 6D.

The plurality of (nine in the present embodiment) optical fiber lines 3D are arranged so as to surround the outer circumference of the tension member 6D. The sensor optical fibers 4Db, 4Dc, 4Dd are all formed in the same structure as the optical fiber line 3D. The sensor optical fibers 4Db, 4Dc, and 4Dd are each disposed between two optical fiber lines 3D surrounding the outer circumference of the tension member 6D, such that their individual centers are equidistant from the center of the sensor optical fiber 4a and are equiangular about the sensor optical fiber 4a.

Formed of resin or the like, the outer coating layers 7Da and 7Db are formed in a two-layer structure so as to surround the outer circumference of the plurality of optical fiber lines 3D. The outer coating layer 7Db constitutes the outer circumference of the cable 10D. The gap between the outer circumference of the tension member 6D and the inner circumference of the outer coating layer 7Da is filled with the filler 8.

In the present embodiment, the sensor optical fibers 4a, 4Db, 4Dc, and 4Dd are also fixed at a plurality of positions in the longitudinal direction of the cable 10D so as to achieve substantially no displacement in the radial direction of the cable 10D. In the cable 10D, however, the sensor optical fiber 4a is fixed to the tension member 6D in the longitudinal direction, and the sensor optical fibers 4Db, 4Dc, and 4Dd are fixed to the tension member 6D or the outer coating layers 7Da and 7Db in the longitudinal direction by the filler 8. In this cable 10D, sensing the strain profile in the longitudinal direction of the sensor optical fibers 4a, 4Db, 4Dc, and 4Dd also leads to achievement of sensing of the shape of the cable 10D in the longitudinal direction.

Sixth Embodiment

Figure 7:
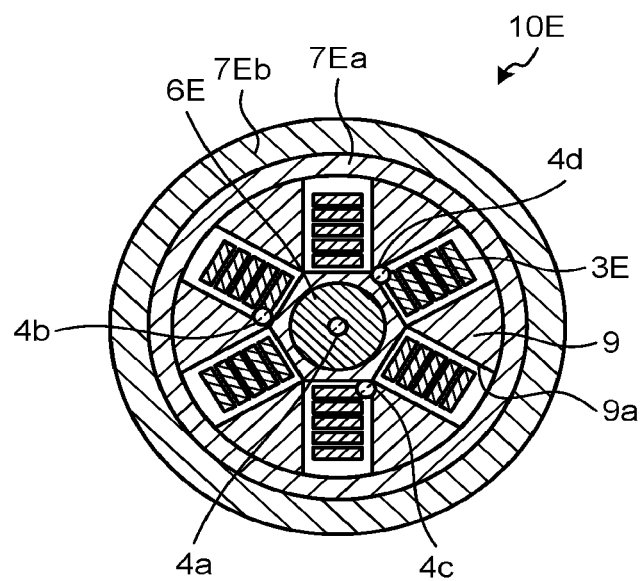
FIG. 7 is a schematic cross-sectional view of a cable according to a sixth embodiment.

FIG. 7 is a schematic cross-sectional view of a surface of a cable according to a sixth embodiment, perpendicular to a longitudinal direction of the cable. As a communication cable having a circular cross section, a cable 10E includes a plurality of optical fiber ribbons 3E as transmission lines for transmitting optical signals, sensor optical fibers 4a, 4b, 4c, and 4d, a tension member 6E, outer coating layers 7Ea and 7Eb, and a slot material 9.

The plurality of optical fiber ribbons 3E, the tension members 6E, the outer coating layers 7Ea and 7Eb, and the slot material 9 are structural materials that constitute the structure of the cable 10E.

The tension member 6E is arranged in the vicinity of the central axis of the cable 10E in the longitudinal direction.

The sensor optical fiber 4a is inserted and fixed in a through hole formed in the vicinity of the central axis of the tension member 6E.

The slot material 9 is provided inside the cable 10E. The tension member 6E is inserted and fixed in a through hole formed in the vicinity of the central axis of the slot material 9. The slot material 9 is formed of resin or the like, and has a plurality of housing grooves 9a spirally formed in the longitudinal direction on the outer circumference thereof. A plurality of optical fiber ribbons 3E is stacked and housed in the housing groove 9a. The optical fiber ribbon 3E is formed by arranging, in parallel, a plurality of optical fiber strands each having a coating formed on the outer circumference of a glass optical fiber, and by applying entire coating on the outer circumference. The outer coating layer 7Ea is formed by winding a non-woven tape around the outer circumference of the slot material 9, for example, and is also referred to as pressure winding. The outer coating layer 7Eb forming the outer circumference of the cable 10E is formed of resin or the like and is formed on the outer circumference of the outer coating layer 7Ea.

Here, the sensor optical fibers 4b, 4c, and 4d are arranged at the bottoms of the housing grooves 9a different from each other and fixed to the slot material 9. In a plane perpendicular to the longitudinal direction, the sensor optical fibers 4b, 4c, and 4d are arranged such that their centers are equidistant from the center of the sensor optical fiber 4a and are equiangular about the sensor optical fiber 4a.

In the present embodiment, the sensor optical fibers 4a, 4b, 4c, and 4d are also fixed at a plurality of positions in the longitudinal direction of the cable 10E so as to achieve substantially no displacement in the radial direction of the cable 10E. In the cable 10E, however, the sensor optical fiber 4a is fixed to the tension member 6D in the longitudinal direction, while the sensor optical fibers 4b, 4c, and 4d are fixed to the slot material 9 in the longitudinal direction. In this cable 10E, sensing the strain profile in the longitudinal direction of the sensor optical fibers 4a, 4b, 4c, and 4d also leads to achievement of sensing of the shape of the cable 10E in the longitudinal direction.

Seventh Embodiment

Figure 8:
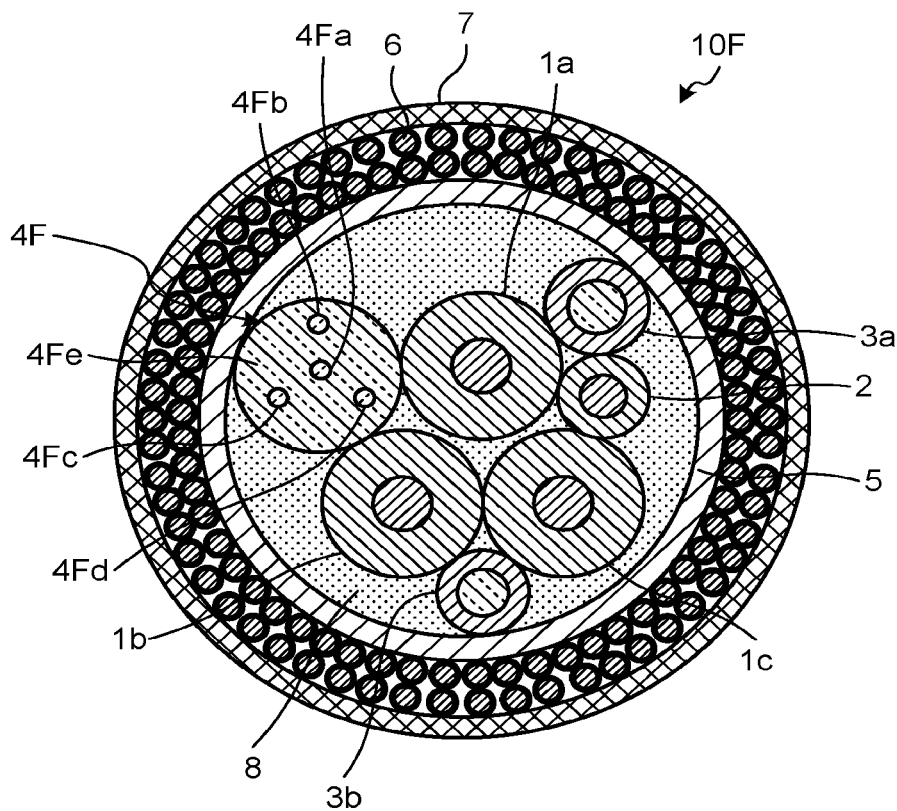
FIG. 8 is a schematic cross-sectional view of a cable according to a seventh embodiment.

FIG. 8 is a schematic cross-sectional view of a surface of a cable according to a seventh embodiment, perpendicular to a longitudinal direction of the cable. As a composite cable having a circular cross section, the cable 10F includes power lines 1a, 1b and 1c, a ground line 2, optical fiber lines 3a and 3b, a sensor optical fiber unit 4F as a sensor optical fiber, an inner coating layer 5, a plurality of tension members 6, an outer coating layer 7, and a filler 8. The power lines 1a, 1b, and 1c, the ground line 2, the optical fiber lines 3a and 3b, the inner coating layer 5, the tension member 6, the outer coating layer 7, and the filler 8 are structural materials constituting the structure of the cable 10F. The sensor optical fiber unit 4F is an example of an optical fiber core wire.

The cable 10F is different from the cable 10 in that the sensor optical fiber unit 4F is provided in place of the sensor optical fibers 4b, 4c, and 4d. The configuration of the other components of the cable 10F is the same as that of the cable 10, and thus the description thereof will be omitted.

The sensor optical fiber unit 4F is spirally arranged around the central axis of the cable 10F in the longitudinal direction. The sensor optical fiber unit 4F is a multi-core optical fiber including a plurality of optical fiber cores in the cladding. That is, the sensor optical fiber unit 4F includes: four optical fiber cores 4Fa, 4Fb, 4Fc, and 4Fd; and a cladding 4Fe formed on the outer circumference of the optical fiber cores 4Fa, 4Fb, 4Fc, and 4Fd. Note that a coating (not illustrated) is formed on the outer circumference of the cladding 4Fe.

The optical fiber core 4Fa is arranged in the vicinity of the central axis of the sensor optical fiber unit 4F. In a plane perpendicular to the longitudinal direction of the sensor optical fiber unit 4F, the optical fiber cores 4Fb, 4Fc, and 4Fd are arranged such that their centers are equidistant from the center of the optical fiber core 4Fa and are equiangular about the optical fiber core 4Fa. Furthermore, the optical fiber cores 4Fb, 4Fc, and 4Fd are spirally arranged around the optical fiber core 4Fa in the longitudinal direction. The spiral period is 10 mm, for example.

Here, in the present embodiment, the sensor optical fiber unit 4F, and the optical fiber cores 4Fa, 4Fb, 4Fc, and 4Fd included in the sensor optical fiber unit 4F are fixed at a plurality of positions in the longitudinal direction of the cable 10F so as to achieve substantially no displacement in the radial direction of the cable 10F. Specifically, the sensor optical fiber unit 4F is fixed in the longitudinal direction to at least one of the structural materials such as the power lines 1a and 1b and the inner coating layer 5 by the filler 8. Furthermore, since the optical fiber cores 4Fa, 4Fb, 4Fc, and 4Fd are included in the sensor optical fiber unit 4F, their relative positions would not change. Accordingly, in this cable 10F, sensing the shape change in the longitudinal direction of the sensor optical fiber cores 4Fa, 4Fb, 4Fc, and 4Fd also leads to achievement of sensing of the shape change of the cable 10F in the longitudinal direction.

The sensor optical fiber unit having a configuration similar to the sensor optical fiber unit 4F can be configured by using four optical fibers each having a single optical fiber core in the cladding. For example, by arranging four optical fiber core wires having a coating outer diameter of 0.9 mm and four optical fiber strands having a coating outer diameter of 250 μm similarly to the optical fiber cores 4Fa, 4Fb, and 4Fc of the sensor optical fiber unit 4F, and coating with a common coating layer, it is possible to obtain a structure similar to the sensor optical fiber unit 4F. In this sensor optical fiber unit, similarly to the optical fiber cores 4Fb, 4Fc, and 4Fd in the sensor optical fiber unit 4F, the three optical fiber strands or optical fiber core wires are spirally arranged around the optical fiber strand or the optical fiber core wire arranged in the longitudinal direction in the vicinity of the central axis.

The sensor optical fiber unit 4F can also be installed at the center of the central axis of the cable 10F in the longitudinal direction. In this case, the sensor optical fiber unit 4F is constantly installed at the center of the central axis of the cable 10F in the longitudinal direction.

The sensor optical fiber in the above embodiment can be obtained by using a single mode optical fiber compliant with G.652, G.653, G.654, G.655, G.656 regulated by the International Telecommunication Union (ITU). The sensor multi-core optical fiber can be obtained by using the optical fiber in which the characteristics of individual optical fiber cores comply with the above regulations. Furthermore, the sensor optical fiber or the sensor multi-core optical fiber can be obtained by using an FGB optical fiber having a fiber Bragg grating core in which the refractive index of the optical fiber core periodically changes in the longitudinal direction. By using the FGB optical fiber, it is possible to efficiently return the light of a specific wavelength backward. This increases the intensity of the backscattered light in the optical fiber core, leading to improvement in the sensitivity of sensing (refer to Paul S. Westbrook, Tristan Kremp, Kenneth S.

Feder, Wing Ko, Eric. M. Monberg, Hongchao Wu, Debra A. Simoff, Thierry F. Taunay, and Roy M. Ortiz, "Continuous Multicore Optical Fiber Grating Arrays for Distributed Sensing Applications" J. Lightw. Technol., vol. 35, no. 6, pp. 1248-1252, March 2017).

Furthermore, the sensor optical fiber in the above embodiment is continuously fixed in the longitudinal direction to a structure to which the fibers are to be fixed. However, the state of fixing is not limited to this as long as the shape of the sensor optical fiber in the longitudinal direction also changes in accordance with the change in the shape of the cable in the longitudinal direction, and thus, the sensor optical fiber may be fixed intermittently in the longitudinal direction, to the structure to which the fiber is to be fixed.

Furthermore, in the present disclosure, there is no need to have all of the plurality of sensor optical fibers fixed to the same structure, and individual sensor optical fibers may be fixed to different structures. Furthermore, the number of sensor optical fibers or optical fiber cores is not limited to four, and may be any number as long as it is in plurality. The cable according to the present disclosure may include a sensor optical fiber that is a single-core optical fiber and a multi-core sensor optical fiber.

Eighth Embodiment

Figure 9:
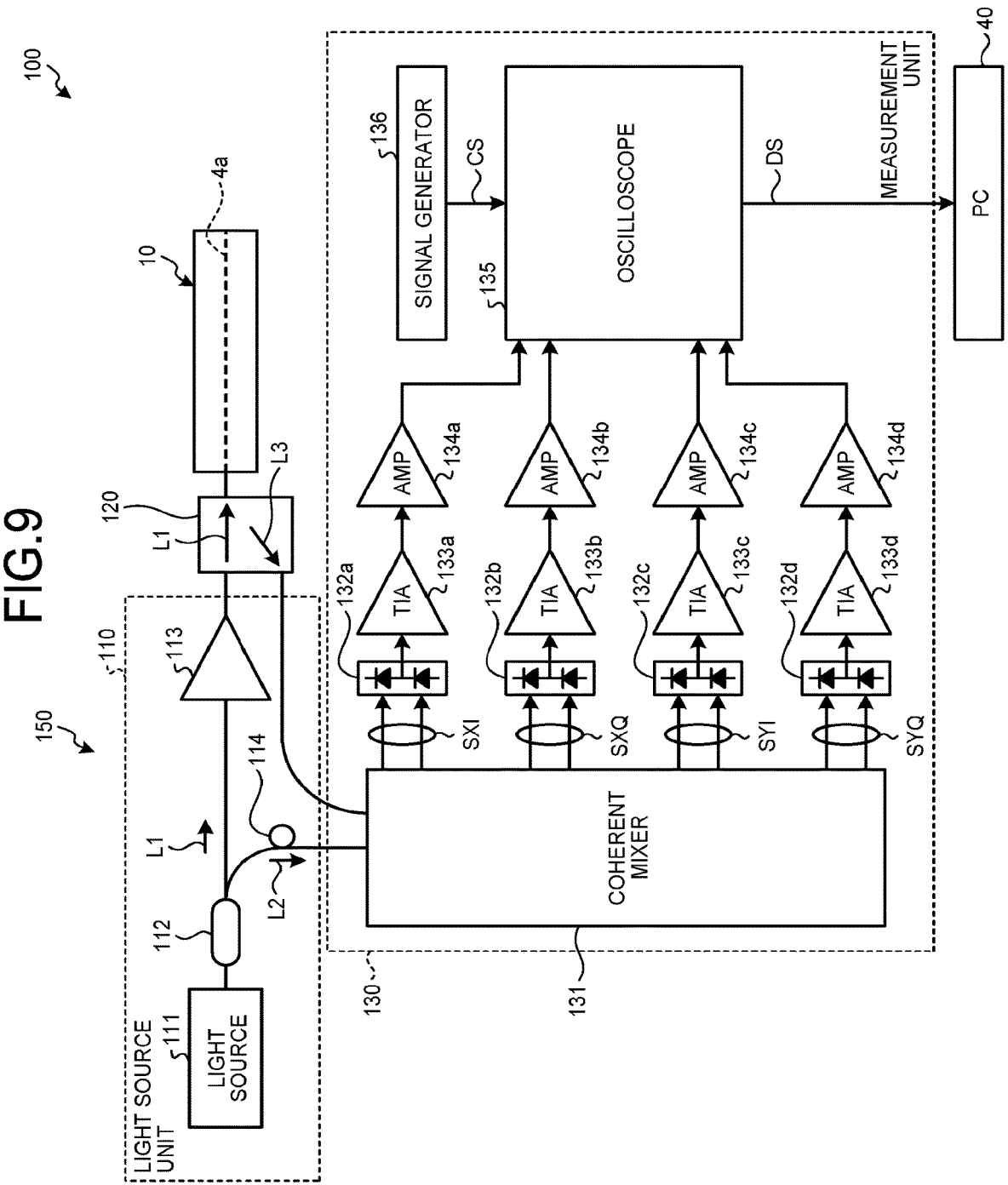
FIG. 9 is a schematic configuration diagram of a cable shape sensing system according to an eighth embodiment.

FIG. 9 is a schematic configuration diagram of a cable shape sensing system according to an eighth embodiment. A cable shape sensing system 100 (hereinafter referred to as the shape sensing system 100 as appropriate) is provided to sense the shape of the cable 10, and includes four light source units 110, four optical devices 120, four measurement units 130, and an arithmetic unit 140. The shape sensing system 100 has software and hardware configurations to enable utilization of the principle of optical frequency domain reflectometry (OFDR). Note that FIG. 9 includes only the illustrations of the light source unit 110, the optical device 120, and the measurement unit 130 corresponding to the sensor optical fiber 4a. The shape sensing system 100 is capable of executing a cable shape sensing method.

The four light source units 110 output test light to be input to one end of each of optical fiber cores of the sensor optical fibers 4a, 4b, 4c, and 4d included in the cable 10. Each of the light source units 110 includes a light source 111 capable of sweeping a wavelength (frequency) at a predetermined period, a polarization-maintaining optical coupler 112, an optical amplifier 113, and a delay optical fiber 114.

The light source 111 outputs linearly polarized laser light having a wavelength of 1.55 µm band, for example. The polarization-maintaining optical coupler 112 splits the linearly polarized laser light into beams of test light L1 and reference light L2. The optical amplifier 113 is an erbium-doped optical fiber amplifier (EDFA), for example, which optically amplifies the test light L1 and outputs the amplified test light L1 to the optical device 120. The delay optical fiber 114 transmits the reference light L2 held in the linearly polarized state, while giving the reference light L2 a predetermined temporal transmission delay and outputs the delayed reference light L2 to the measurement unit 130.

The optical device 120 outputs the test light L1 to the sensor optical fiber 4a of the cable 10. That is, the optical device 120 outputs the test light to be input to one end of each of the plurality of optical fiber cores. In other words, the optical device 120 executes a step of inputting the test light to one end of each of the plurality of optical fiber cores in the cable shape sensing method. The sensor optical fiber 4a transmits the test light L1 from one end to the other end of the fiber. During the transmission, Rayleigh scattered light due to the test light L1 is generated in the longitudinal direction of the sensor optical fiber 4a, transmitted in a direction opposite to the test light L1 as backscattered light, so as to be output from the end where the test light L1 has been input. The optical device 120 outputs the output backscattered light L3 to the measurement unit 130. An applicable example of this optical device 120 is an optical circulator.

The measurement unit 130 includes a coherent mixer 131, balanced photodetectors 132a, 132b, 132c, and 132d, transimpedance amplifiers 133a, 133b, 133c, and 133d, electric amplifiers 134a, 134b, 134c, and 134d, an oscilloscope 135, and a signal generator 136. The measurement unit 130 performs measurement regarding the backscattered light output from one end of each of the plurality of optical fiber cores. In other words, the measurement unit 130 executes a step of performing measurement regarding the backscattered light output from one end of each of the plurality of optical fiber cores in the cable shape sensing method.

The coherent mixer 131 causes the input reference light L2 and the backscattered light L3 to interfere with each other, and outputs optical signals, namely, an I signal referred to as SXI corresponding to an Intensity (I) component of a set of X polarization, a Q signal referred to as SXQ corresponding to a phase (Q) component of a set of X polarization, an I signal referred to as SYI corresponding to a set of Y polarization, and a Q signal referred to as SYQ corresponding to a set of Y polarization. The X polarization and the Y polarization are linear polarizations orthogonal to each other. The balanced photodetectors 132a, 132b, 132c, and 132d respectively receive the I signal SXI, the Q signal SXQ, the I signal SYI, and the Q signal SYQ, convert them into current signals, and output the converted current signals. Each of the transimpedance amplifiers 133a, 133b, 133c, and 133d converts the input current signal into a voltage signal and outputs the voltage signal. Each of the electric amplifiers 134a, 134b, 134c, and 134d amplifies the input voltage signal and outputs the amplified voltage signal to the oscilloscope 135.

A clock signal CS to achieve synchronization with a wavelength sweep period of the light source 111 is input from the signal generator 136 to the oscilloscope 135. Using this clock signal CS, the oscilloscope 135 measures an interference signal generated by the reference light L2 and the backscattered light L3. The horizontal axis of the waveform measured by the oscilloscope 135 represents the time, while the vertical axis represents the intensity of the interference signal.

The frequency (wavelength) of the light output from the light source 111 changes with time. Accordingly, the longer the distance from the light source to the backscattered point on the optical fiber, the more the optical frequency difference arises between the backscattered light L3 and the reference light L2. In the measurement unit 130, an interference waveform of the backscattered light L3 and the reference light L2 is observed by using the oscilloscope 135, and the interference frequency of this interference waveform changes in accordance with the distance. Therefore, by applying Fourier transform on the interference waveform, it is possible to obtain the intensity of scattered light with respect to the frequency, that is, the distance.

When there is a local shape change (strain) at a certain position in the longitudinal direction of the sensor optical fiber 4a, the waveform of the interference signal changes at a position of the frequency corresponding to that position. This change in waveform is caused by, for example, a change in intensity or phase of backscattered light due to expansion/contraction (strain) of the sensor optical fiber 4a generated with the change in shape. Accordingly, by measuring the waveform of the interference signal and performing the Fourier transform on the waveform, it is possible to obtain information regarding strain profile in the longitudinal direction of the sensor optical fiber 4a. The oscilloscope 135 outputs waveform data of the interference signal as a data signal DS to the arithmetic unit 140 constituted with a personal computer (PC). The waveform data of the interference signals of the other sensor optical fibers 4b, 4c, and 4d are also output from the oscilloscope 135 of the measurement unit 130 corresponding thereto as the data signal DS to the arithmetic unit 140. The oscilloscope 135 and the signal generator 136 may be replaced with a digital signal processor having similar functions.

Based on the measurement result of each of beams of backscattered light, the arithmetic unit 140 calculates the strain of each of the plurality of optical fiber cores and calculates the shape of the cable 10 based on each calculated strain. In other words, the arithmetic unit 140 executes a step of calculating the individual strains of the plurality of optical fiber cores based on the measurement result regarding the individual beams of backscattered light in the cable shape sensing method and calculating the shape of the cable 10 based on the calculated individual strains. Specifically, the arithmetic unit 140 calculates a strain profile based on the data signal containing information of the strain profile in the longitudinal direction of the sensor optical fibers 4a, 4b, 4c, and 4d obtained by applying Fourier transform on the waveform data of the interference signal, and then, calculates the shape of the cable 10 based on the calculated strain profile. This method is a known calculation method in which Frenet-Serret equations are applied in the longitudinal direction of an optical fiber (J. P. Moore, "Shape sensing using multi-core fiber", in Proc. Opt. Fiber Commun. Conf., 2015, p.Th1C.2, and J. P. Moore and M. D. Rogge, "Shape sensing using multi-core fiber optic cable and parametric curve solutions", Opt. Express, vol. 20, no. 3, pp. 2967-2973, 2012).

As described above, the shape sensing system 100 can sense the shape of the cable 10.

Next, characteristics of the shape sensing system 100 will be described based on a specific example. First, examples of characteristic of the test light L1 and the reference light L2 include a spectral linewidth. The OFDR observes the interference state between the reference light L2 and the backscattered light L3 from each of the sensor optical fibers 4a, 4b, 4c, and 4d. Therefore, in order to achieve sufficient interference of the two beams of light, the two beams of light need to maintain coherence. In other words, there is a need to have a difference between a distance for which the test light L1 is branched from the reference light L2 to reciprocate through the sensor optical fibers 4a, 4b, 4c, and 4d until being combined with the reference light L2 and a distance for which the reference light L2 is branched from the test light L1 to be combined with the backscattered light L3 coming from each of the sensor optical fibers 4a, 4b, 4c, and 4d, the difference being shorter than the coherence length of the test light L1. Therefore, in the case of increasing the lengths of the sensor optical fibers 4a, 4b, 4c, and 4d, there is a need to have a light source 111 that generates laser light having a longer coherence length, that is, having a narrow spectral linewidth. For example, in order to set the length of the cable 10 to approximately 10 km, there is a need to provide the laser light having a spectral linewidth of 10 kHz or less.

Furthermore, when measuring the strain profile of each of the sensor optical fibers 4a, 4b, 4c, and 4d, it is desirable to have higher intensity in the backscattered light L3 from each of the sensor optical fibers 4a, 4b, 4c, and 4d. Therefore, it is desirable to have higher intensity in the laser light output from the light source 111. On the other hand, there is a problem that high intensity in light propagating in the optical fiber would lead to occurrence of stimulated Brillouin scattering (SBS). When SBS occurs, most of the input light intensity is scattered backward, leading to attenuation of intensity of the light of light traveling forward. Therefore, the intensity of the test light L1 input to each of the sensor optical fibers 4a, 4b, 4c, and 4d is desirably set to an SBS generation threshold or less. Formulas (1a) and (1b) are relational expressions indicating threshold intensity $P_{th}$ of SBS that occurs in the optical fiber. Accordingly, optical intensity $P_{in}$ of the test light L1 when being input to each of the sensor optical fibers 4a, 4b, 4c, and 4d desirably satisfies Formula (2):

$$P_{th} = 21 \frac{KA_{eff}}{g_B L_{eff}} \left\{ 1 + \left( \frac{\Delta v}{\Delta v_B} \right) \right\} \tag{1a}$$

$$L_{eff} = \frac{1 - \exp(-\alpha L)}{\alpha} \tag{1b}$$

The variables in Formulas (1a) and (1b) are as follows.
$\Delta v$: Linewidth of light source, K: Polarization dependence parameter, $A_{eff}$: Effective area of optical fiber, $g_B$: Brillouin gain constant, $\Delta v_B$: Linewidth of Brillouin gain spectrum, $L_{eff}$: Effective length of optical fiber, $\alpha$: Optical fiber loss factor, L: Optical fiber length $$P_{in} < P_{th} \tag{2}$$

In OFDR, a beat frequency of the interference light between the reference light L2 and the backscattered light L3 (frequency difference between the reference light L2 and the backscattered light L3) corresponds to the position of each of the sensor optical fibers 4a, 4b, 4c, and 4d in the longitudinal direction. Therefore, in order to measure the strain profile with higher position resolution, it is desirable to increase the beat frequency at each full length of the sensor optical fibers 4a, 4b, 4c, and 4d so as to increase the frequency change with respect to the length. Here, regarding, at a specific position, a beat frequency due to the backscattered light L3 from the position, in order to increase the beat frequency, there is a method to increase the frequency sweep speed of the laser light output from the light source 111, for example. Assuming that the frequency discrimination limit in the measurement unit 130 is 100 Hz, in order to obtain a position resolution of 1 cm, for a position at a distance of 10 km from an end at which the light of the sensor optical fiber 4a is input, it is desirable to set the laser light frequency sweep speed to 1 THz/s or more.

Ninth Embodiment

Figure 10:
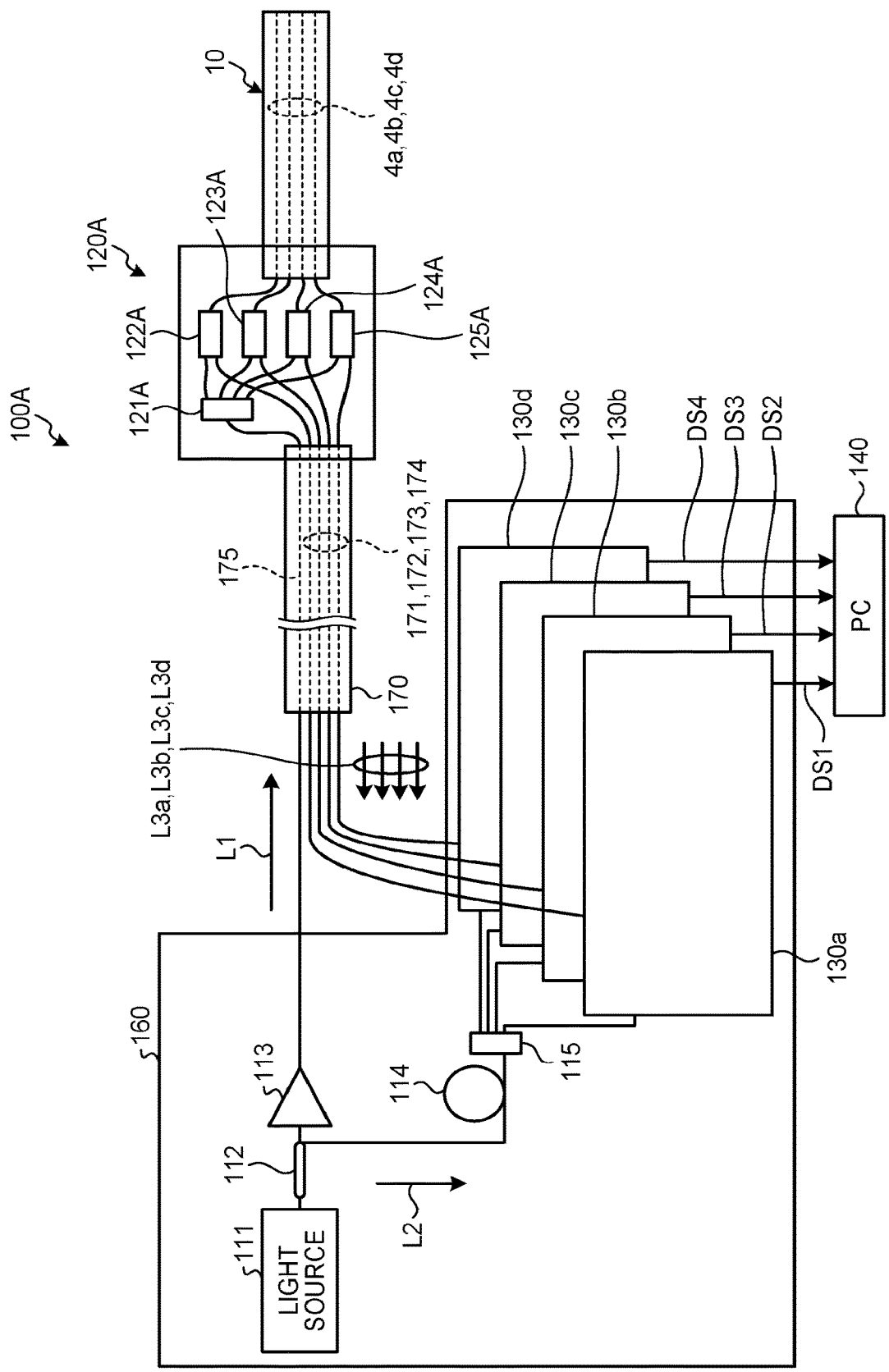
FIG. 10 is a schematic configuration diagram of a shape sensing system according to a ninth embodiment.

FIG. 10 is a schematic configuration diagram of a cable shape sensing system according to a ninth embodiment. A shape sensing system 100A is provided for sensing the shape of the cable 10, and includes an optical device 120A, an arithmetic unit 140, a light source/measurement unit 160, and an extension cable 170. Similarly to the shape sensing system 100, the shape sensing system 100A has software and hardware configurations to enable utilization of the principle of Optical Frequency Domain Reflectometry (OFDR). The shape sensing system 100A can execute a cable shape sensing method.

The light source/measurement unit 160 includes a light source 111, a polarization-maintaining optical coupler 112, an optical amplifier 113, a delay optical fiber 114, an optical coupler 115, and measurement units 130a, 130b, 130c, and 130d. The light source 111, the polarization-maintaining optical coupler 112, the optical amplifier 113, and the delay optical fiber 114 are the same as those in the shape sensing system 100, and thus the description thereof will be omitted.

The optical coupler 115 is a 1×4 port polarization-maintaining optical coupler, which is connected, on the 1-port side, to the delay optical fiber 114 while being connected, on the 4-port side, individually to the measurement units 130a, 130b, 130c, and 130d. The optical coupler 115 splits the reference light L2 input from the delay optical fiber 114 into four beams, and outputs each of the split beams of reference light L2 to the measurement units 130a, 130b, 130c, and 130d.

The extension cable 170 includes backscattered light transmission lines 171, 172, 173, and 174, and a separate test light transmission line 175. The test light transmission line 175 transmits the test light L1 output from the optical amplifier 113 to the optical device 120A.

The optical device 120A includes optical devices 121A, 122A, 123A, 124A, and 125A. The optical device 121A is a 1×4 port optical coupler. The optical devices 122A, 123A, 124A, and 125A are 1×2 port optical couplers or optical circulators. The optical device 121A is connected, on the 1-port side, to the test light transmission line 175, while being connected, on the 4-port side, to one of the 2-port sides of the optical devices 122A, 123A, 124A, and 125A, individually. The other of the optical devices 122A, 123A, 124A, and 125A on the two-port side is connected to the backscattered light transmission lines 171, 172, 173, and 174, respectively. The optical devices 122A, 123A, 124A, and 125A are connected, on their 1-port sides, to the sensor optical fibers 4a, 4b, 4c, and 4d of the cable 10, respectively.

The optical device 121A splits the test light L1 input from the test light transmission line 175 into four beams, and outputs each of the split beams of test light L1 to each of the optical devices 122A, 123A, 124A, and 125A. The optical devices 122A, 123A, 124A, 125A output their input beams of test light L1 to the sensor optical fibers 4a, 4b, 4c, and 4d of the cable 10, respectively. That is, the optical devices 122A, 123A, 124A, and 125A output the test light to be input to one end of each of the plurality of optical fiber cores. In other words, the optical devices 122A, 123A, 124A, and 125A execute the step of inputting the test light to one end of each of the plurality of optical fiber cores in the cable shape sensing method.

Each of the sensor optical fibers 4a, 4b, 4c, and 4d transmits the test light L1 from one end to the other end of the fiber. During the transmission, Rayleigh scattered light due to the test light L1 is generated in the longitudinal direction of the sensor optical fibers 4a, 4b, 4c, and 4d transmitted in a direction opposite to the test light L1 as backscattered light, so as to be output from the end where the test light L1 has been input. The optical devices 122A, 123A, 124A, and 125A respectively receive inputs of beams of backscattered light L3a, L3b, L3c, and L3d respectively output from the sensor optical fibers 4a, 4b, 4c, and 4d, then outputs the beams of the backscattered light L3a, L3b, L3c, and L3d to the backscattered light transmission lines 171, 172, 173, and 174, respectively. The backscattered light transmission lines 171, 172, 173, 174 respectively transmit the backscattered light L3a, L3b, L3c, L3d and output them to the measurement units 130a, 130b, 130c, 130d.

The measurement units 130a, 130b, 130c, and 130d each have configurations and function similar to the measurement unit 130 in the shape sensing system 100. That is, the measurement units 130a, 130b, 130c, and 130d perform measurement regarding the backscattered light output from one end of each of the plurality of optical fiber cores. In other words, the measurement units 130a, 130b, 130c, and 130d execute a step of performing measurement regarding the backscattered light output from one end of each of the plurality of optical fiber cores in the cable shape sensing method. Specifically, the measurement units 130a, 130b, 130c, and 130d individually cause the input reference light L2 and beams of backscattered light L3a, L3b, L3c, and L3d to interfere with each other respectively, and output the waveform data of interference signals to the arithmetic unit 140, respectively as data signals DS1, DS2, DS3, and DS4.

The arithmetic unit 140 calculates the shape of the cable 10 based on the data signals DS1, DS2, DS3, and DS4 containing information regarding strain profile in the longitudinal direction of each of the sensor optical fibers 4a, 4b, 4c, and 4d respectively. This enables the shape sensing system 100A to sense the shape of the cable 10.

In the shape sensing system 100A, the extension cable 170 transmits the test light L1 via the test light transmission line 175, while transmitting beams of the backscattered light L3a, L3b, L3c, L3d via the backscattered light transmission lines 171, 172, 173, and 174 separate from the test light transmission line 175. Therefore, even when backscattered light is generated in the test light transmission line 175, this backscattered light would not be transmitted through the backscattered light transmission lines 171, 172, 173, or 174, and would not be input in the measurement units 130a, 130b, 130c, or 130d. With this configuration, the shape sensing system 100A senses only the shape of the cable 10 including each of the sensor optical fibers 4a, 4b, 4c, and 4d in which beams of the backscattered light L3a, L3b, L3c, and L3d due to the test light L1 are respectively generated. Therefore, for example, when the length of the extension cable 170 is several kilometers and the length of the cable 10 is several hundred meters, the shape sensing system 100A can sense the shape of the cable 10 having a length of several hundred meters installed in a remote place several kilometers away from the light source/measurement unit 160.

In the eighth and ninth embodiments above, the shape sensing systems 100 and 100A each have a configuration to enable utilization of the principle of OFDR. However, the measurement principle used in the shape sensing system according to the present disclosure is not limited to OFDR. For example, it is allowable to provide a shape sensing system having software and hardware configurations to enable measurement of the Brillouin scattered light as beams of the backscattered light from the sensor optical fibers 4a, 4b, 4c, and 4d, individually and enable calculation of strain of each of the sensor optical fibers 4a, 4b, 4c, and 4d based on the measurement results regarding each of beams of the Brillouin scattered light. In this case, the shape sensing system has a configuration enabling the principle of Brillouin optical time domain reflectometry (BOTDR).

As another embodiment, it is also allowable to use a configuration of the shape sensing system 100A of the ninth embodiment, in which the extension cable 170 is deleted, and the test light L1 is output from the light source/measurement unit 160 to the optical device 120A without interposing the extension cable 170, and beams of the backscattered light L3a, L3b, L3c, and L3d respectively from the sensor optical fibers 4a, 4b, 4c, and 4d are input to the light source/measurement unit 160.

Tenth Embodiment

The cable shape sensing system as described in the eighth and ninth embodiments can be applied to various sensing systems. Hereinafter, embodiments of the sensing system will be described.

Figure 11:
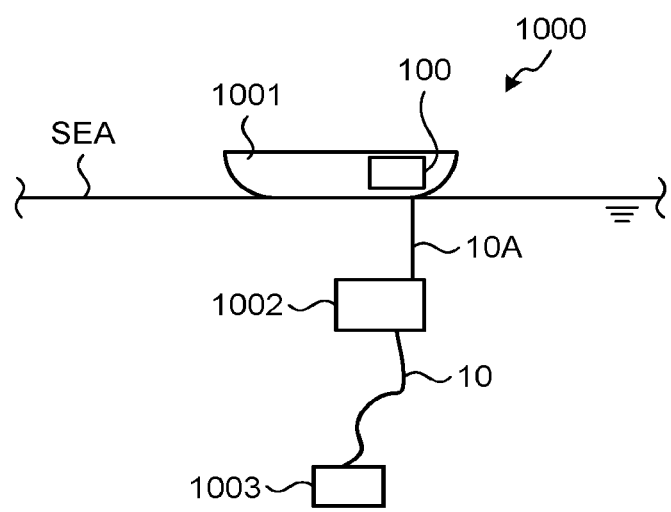
FIG. 11 is a schematic configuration diagram of a sensing system according to a tenth embodiment.

FIG. 11 is a schematic configuration diagram of a sensing system according to a tenth embodiment. A sensing system 1000 includes cables 10A and 10 and a shape sensing system 100. The sensing system 1000 further includes an ocean exploration vessel 1001, a launcher 1002 which is an unmanned explorer, and a vehicle 1003 which is a child device, and is applied to a sea floor exploration system for exploring the sea floor of the sea (SEA).

The shape sensing system 100 is mounted on the ocean exploration vessel 1001. The cable 10A is connected to the shape sensing system 100. Also referred to as a primary cable, the cable 10A has a cross-sectional structure similar to that of the cable 10, and has a relatively long length, for example, 10 km.

The launcher 1002 is connected to the ocean exploration vessel 1001 via the cable 10A. The launcher 1002 is equipped with various exploration devices and a mechanism for accommodating, guiding, and recovering the vehicle 1003.

The cable 10 is connected to the cable 10A via the launcher 1002. The cable 10 is also referred to as a secondary cable, having a relatively short length, for example, 200 m.

The vehicle 1003 is connected to the launcher 1002 via the cable 10. The vehicle 1003 starts from the launcher 1002 and moves in the vicinity of the sea floor. The vehicle 1003 is equipped with various exploration devices. The vehicle 1003 is located on a tip end side of the cables 10A and 10 opposite to the end to which the test light is input from the shape sensing system 100.

The cables 10 and 10A are composite cables each having a function of supplying electric power from the ocean exploration vessel 1001 to the launcher 1002 and the vehicle 1003 and performing communication.

As described in the eighth embodiment, the shape sensing system 100 can sense the shapes of the cables 10 and 10A.

Under the sea, the cables 10 and 10A move with tidal currents, but their behaviors are often unknown. In some cases, the strain of the cables 10 and 10A might be concentrated at a specific position, or a part of the twist of the cables 10A and 10 might be transmitted to the tip end of the cable to cause a kink, which might cause damage. Therefore, the cable 10 and 10A are structurally designed in consideration of torque balance. Unfortunately, however, it is difficult to reliably avoid the factors that lead to the breakage of the cables 10A and 10, such as the occurrence of local strain and kink described above, or damage due to contact with rocks protruding from the sea floor at a position near the sea floor.

Regarding this problem, the sensing system 1000 includes the shape sensing system 100 capable of sensing the shape of the cables 10 and 10A, enabling identifying positions having local strain or kink without recovering the cables 10 and 10A from under the sea. As a result, damage or breakage of the cables 10 and 10A can be predicted to some extent. This also makes it possible to collect data for more efficient cable inspection and elucidation of the mechanism of distortion and kink generation.

In addition, based on the shapes of the cables 10A and 10, the arithmetic unit 140 of the shape sensing system 100 may calculate the three-dimensional relative position of the vehicle 1003, which is the measurement target object, with respect to the ocean exploration vessel 1001. This enables the sensing system 1000 to sense the three-dimensional relative position of the vehicle 1003. The ocean exploration vessel 1001 is equipped with a GPS device. The GPS device can obtain information of the absolute position (latitude/longitude) of the ocean exploration vessel 1001 on the earth. In this case, the arithmetic unit 140 can capture the position information of the ocean exploration vessel 1001 from the GPS device and can sense the three-dimensional absolute position of the vehicle 1003 under the sea based on the position information and the shape information of the cable 10A and the cable 10.

Eleventh Embodiment

Figure 12:
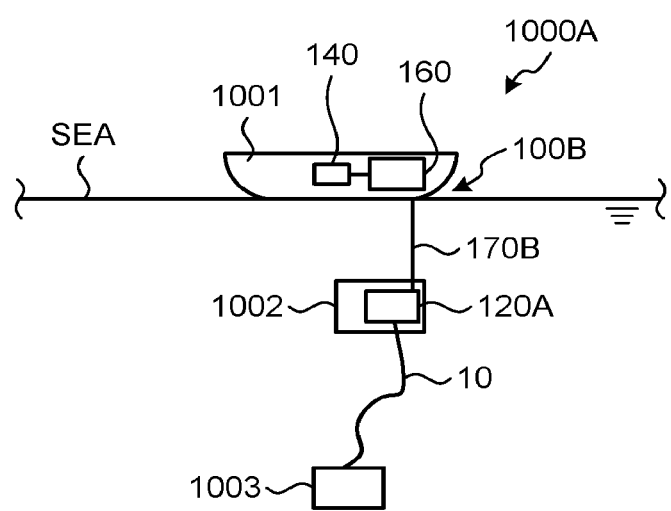
FIG. 12 is a schematic configuration diagram of a sensing system according to an eleventh embodiment.

FIG. 12 is a schematic configuration diagram of a sensing system according to an eleventh embodiment. A sensing system 1000A includes a cable 10 and a shape sensing system 100B. The shape sensing system 100B includes an optical device 120A, an arithmetic unit 140, a light source/measurement unit 160, and a primary cable 170B. The optical device 120A, the arithmetic unit 140, and the light source/measurement unit 160 have the configurations similar to the corresponding components in the shape sensing system 100A illustrated in FIG. 10 and thus the description thereof will be omitted. The arithmetic unit 140 and the light source/measurement unit 160 are mounted on the ocean exploration vessel 1001. The optical device 120A is mounted on the launcher 1002. The shape sensing system 100B can execute a cable shape sensing method.

The configuration of the primary cable 170B is a configuration obtained by removing the sensor optical fibers 4a, 4b, 4c, and 4d from the configuration of the cable 10 and adding four backscattered light optical transmission lines similar to the extension cable 170 illustrated in FIG. 10 and a separate test light transmission line to this configuration. The length of the primary cable 170B is relatively long, for example, 10 km.

The primary cable 170B is a composite cable and is used for power supply and communication between the ocean exploration vessel 1001, the launcher 1002, and the vehicle 1003, similarly to the cable 10. Furthermore, similarly to the extension cable 170, the primary cable 170B has a function of transmitting test light L1 to the optical device 120A through the test light transmission line. In addition, the primary cable 170B has a function of transmitting each of beams of backscattered light L3a, L3b, L3c, and L3d respectively from the sensor optical fibers 4a, 4b, 4c, and 4d of the cable 10 to the light source/measurement unit 160 via each of the four backscattered light transmission lines.

In this sensing system 1000A, the shape sensing system 100B can sense the shape of the cable 10 connected from the light source/measurement unit 160 via the primary cable 170B to the end of a long cable of several kilometers or more. In particular, it is possible to suitably sense the shape of the cable 10 that is located on the tip side of the primary cable 170B, being close to the sea floor and susceptible to kinks.

Furthermore, based on the shape of the cable 10, the arithmetic unit 140 of the shape sensing system 100B may calculate an approximate three-dimensional relative position of the vehicle 1003, which is the measurement target object, with respect to the ocean exploration vessel 1001. This enables the sensing system 1000 to sense the approximate three-dimensional relative position of the vehicle 1003. Note that the arithmetic unit 140 can capture the position information of the ocean exploration vessel 1001 from the GPS device and can sense the approximate three-dimensional absolute position of the vehicle 1003 under the sea based on the position information and the shape information of the cable 10A and the cable 10.

Twelfth Embodiment

Figure 13:
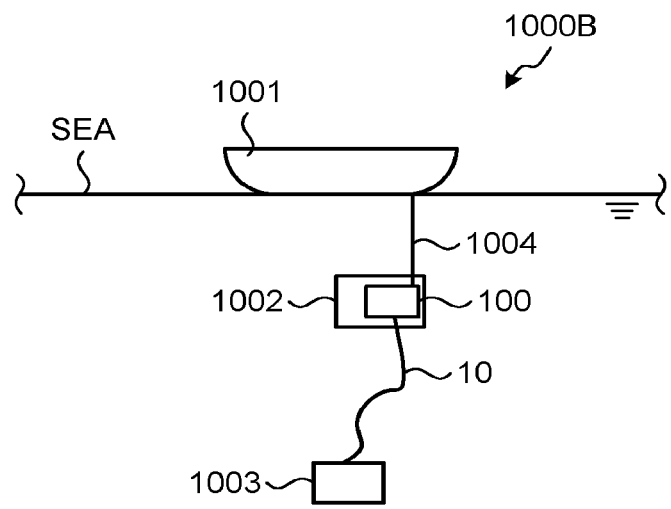
FIG. 13 is a schematic configuration diagram of a sensing system according to a twelfth embodiment.

FIG. 13 is a schematic configuration diagram of a sensing system according to a twelfth embodiment. In a sensing system 1000B, the shape sensing system 100 that senses the shape of the cable 10 is mounted on the launcher 1002. The ocean exploration vessel 1001 and the launcher 1002 are connected by a primary cable 1004 which is a composite cable used for power supply and communication.

In this sensing system 1000B, it is possible to suitably sense the shape of the cable 10 that is located on the tip side of the primary cable 1004, being close to the sea floor and susceptible to kinks.

Since the launcher 1002 can reach the deep sea equivalent to the cable length of the primary cable 1004, high water pressure is applied to the launcher 1002. Therefore, the shape sensing system 100 mounted on the launcher 1002 needs to have a water pressure resistant configuration, such that the whole shape sensing system 100 is installed in a water pressure resistant container.

Thirteenth Embodiment

Figure 14:
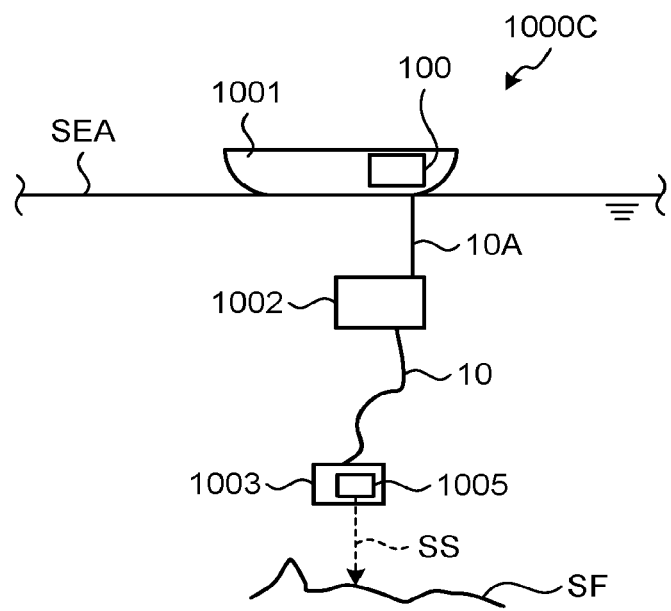
FIG. 14 is a schematic configuration diagram of a sensing system according to a thirteenth embodiment.

FIG. 14 is a schematic configuration diagram of a sensing system according to a thirteenth embodiment. A sensing system 1000C includes cables 10 and 10A, a shape sensing system 100, and a sonar device 1005 which is a distance measuring device. That is, the sensing system 1000C has a configuration obtained by adding the sonar device 1005 to the configuration of the sensing system 1000 illustrated in FIG. 11.

The sonar device 1005 is mounted on the vehicle 1003. The sonar device 1005 transmits a sound wave signal SS toward a predetermined position on a sea floor SF and receives a sound wave signal reflected at the predetermined position. With this configuration, the distance from the sonar device 1005 to a predetermined position on the sea floor SF is measured.

As described above, the sensing system 1000 can sense the three-dimensional absolute position of the vehicle 1003 under the sea. Furthermore, in the sensing system 1000C, the arithmetic unit 140 can calculate the three-dimensional absolute position of the predetermined position on the sea floor SF by using the information of the three-dimensional absolute position of the vehicle 1003 and the information of the distance to the predetermined position on the sea floor SF measured by the sonar device 1005. By performing measurements of the distance to the sea floor SF using the sonar device 1005 at various points, the arithmetic unit 140 can calculate the three-dimensional coordinates of the sea floor SF. As a result, the sensing system 1000C can sense the three-dimensional coordinates and shape of the sea floor SF. In this case, the sea floor SF corresponds to the measurement target object located on the tip end side of the cable 10.

In the tenth to thirteenth embodiments, the measurement target object for which position or shape is to be measured is the vehicle 1003 or the sea floor SF. However, the measurement target object for which position or shape is to be measured is not limited to these. For example, the sensing system according to the present disclosure can be applied to usages of sensing the position of a research robot that enters a building and inspects the inside of the building, and sensing the internal shape of the building.

Fourteenth Embodiment

Figure 15:
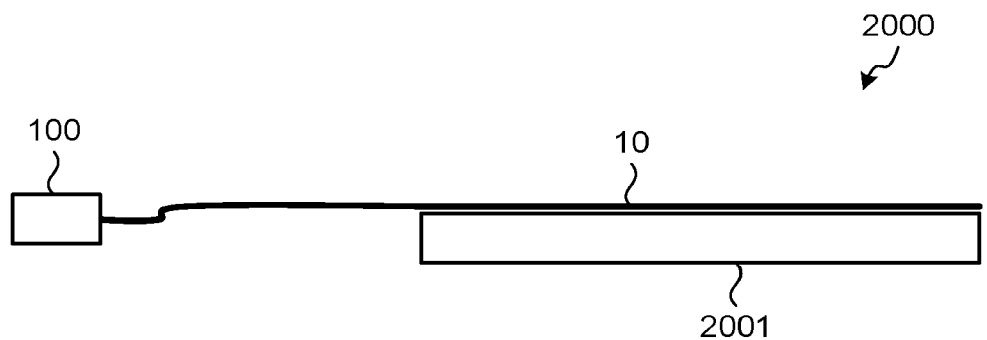
FIG. 15 is a schematic configuration diagram of a sensing system according to a fourteenth embodiment.

FIG. 15 is a schematic configuration diagram of a sensing system according to a fourteenth embodiment. A sensing system 2000 includes a cable 10 and a shape sensing system 100. The cable 10 is installed along a track 2001 such as a railroad track, which is a measurement target object. The cable 10 is in contact with the track 2001 and is fixed continuously or intermittently in the longitudinal direction.

When the track 2001 deforms due to expansion, contraction, bending or the like, the shape of the cable 10 also changes accordingly. The shape sensing system 100 can sense the deformation of the track 2001 by sensing the shape deformation of the cable 10. This enables the sensing system 2000 to monitor the occurrence of an abnormality in shape on the track 2001.

The measurement target object is not limited to a track, but may be a structure such as a bridge. Furthermore, instead of the shape sensing system 100, the shape sensing system 100A may be used to configure the sensing system. In the case of using the shape sensing system 100A, it is possible to install the cable 10 of the shape sensing system 100A on the measurement target object, and possible to install the arithmetic unit 140 and the light source/measurement unit 160 via the extension cable 170 at a location remote from the measurement target object. With this installation, for example, it is possible, using the cable 10, to sense the shape of a building or the like located in a mountain or the like where it is difficult to install the arithmetic unit 140 or the light source/measurement unit 160 or difficult for a measurer to reach, achieving monitoring the occurrence of a geometric abnormality.

In the cable shape sensing system or the sensing system according to the above eighth to fourteenth embodiments, the cable for sensing the shape is mainly the cable 10 according to the first embodiment. However, this cable 10 may be appropriately replaced with cables in the second to seventh embodiments.

Moreover, an optical fiber typically expands and contracts in response to changes in temperature. Therefore, when measuring the strain profile of the sensor optical fiber, a change in temperature of the sensor optical fiber would affect strain measurement. Therefore, it is preferable, by using the arithmetic unit of the shape sensing system, to obtain a temperature profile in the longitudinal direction of the cable for which shape sensing is to be performed, based on the measurement result of the backscattered light from at least one of the optical fiber cores of the sensor optical fiber, and preferable to correct the calculated strain of each of the plurality of optical fiber cores based on the temperature profile. The temperature profile in the longitudinal direction of a cable (sensor optical fiber) can be measured by methods such as the Raman OTDR (R-OTDR) method using the change in Raman scattering in the sensor optical fiber, and the BOTDR method using the frequency change of Brillouin scattering. Therefore, the shape sensing system preferably has software and hardware configurations that enable measurement of temperature profile using these methods and that enable subsequent correction of the strain based on the temperature profile obtained. Note that the optical fiber core of the sensor optical fiber used to measure the temperature profile may be located at any position in the cable.

The present disclosure is not limited to the above-described embodiments. The present disclosure also includes those obtained by appropriately combining the components of the above-described embodiments. Furthermore, further effects and modifications can be easily derived by those skilled in the art. Therefore, broader aspects of the present disclosure and various modifications are conceivable, not limited to the above embodiments.

For example, the cable is only required to include a plurality of optical fiber cores and at least one optical fiber core wire having at least one optical fiber core. Accordingly, it is allowable to implement various configurations having different specifications in the number and layout of the optical fiber cores and the optical fiber core wires.

The present disclosure can be used for sensing various physical quantities using an optical fiber.

REFERENCE SIGNS LIST

According to the present disclosure, there is an effect of achieving a cable capable of sensing the shape in the longitudinal direction.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A cable comprising:
a plurality of optical fiber cores; and
one or more optical fiber core wires including one or more of the optical fiber cores,
wherein at least one of the optical fiber core wire is fixed at a plurality of positions in a longitudinal direction of the cable so as to achieve substantially no displacement in a cable radial direction,
at least a pair of the optical fiber core wires are fixed in a plane perpendicular to the longitudinal direction of the cable so as to achieve substantially no displacement relative to each other, and
sensing of a strain profile in the longitudinal direction of at least the pair of the optical fiber core wires leads to achievement of sensing of a shape of the cable in the longitudinal direction,
wherein the cable is formed of a plurality of structural materials including a transmission line, and
at least one of the optical fiber core wires is fixed, at a plurality of positions in the longitudinal direction, to at least one of the plurality of structural materials.

2. The cable according to claim 1,
wherein the plurality of structural materials includes an outer coating layer that forms an outer circumference of the cable, and
at least one of the optical fiber core wires is fixed to the outer coating layer.

3. The cable according to claim 1,
wherein the plurality of structural materials includes an inner coating layer provided inside the cable, and
at least one of the optical fiber core wires is fixed to the inner coating layer.

4. The cable according to claim 1,
wherein the plurality of structural materials includes filler filled in at least a part of the inside of the cable, and
at least one of the optical fiber core wires is fixed to the filler.

5. The cable according to claim 1,
wherein the plurality of structural materials includes a tension member, and
at least one of the optical fiber core wires is fixed to the tension member.

6. The cable according to claim 1,
wherein the plurality of structural materials includes a slot material provided inside the cable, and
at least one of the optical fiber core wires is fixed to the slot material.

7. The cable according to claim 1,
wherein at least one of the optical fiber core wires is continuously fixed, in the longitudinal direction, to the structural material to which the optical fiber core wires are to be fixed.

8. The cable according to claim 1,
wherein a cross section of the cable is circular.

9. The cable according to claim 1,
wherein the transmission line is a power line.

10. The cable according to claim 1,
wherein the transmission line is a communication line.

11. The cable according to claim 1,
wherein at least one of the optical fiber cores is a core of a single-core optical fiber.

12. The cable according to claim 1,
wherein at least two of the optical fiber cores are cores of multi-core optical fibers.

13. The cable according to claim 1,
wherein at least one of the optical fiber cores is a fiber Bragg grating core having a refractive index that changes periodically in the longitudinal direction.

14. The cable according to claim 1,
wherein one of the optical fiber cores is arranged in a vicinity of a central axis of the cable in the longitudinal direction.

15. The cable according to claim 1,
wherein at least one of the optical fiber cores is arranged in a twisted state around a central axis of the cable in the longitudinal direction.

16. A cable shape sensing system comprising:
a light source unit that outputs test light to be input to one end of each of the plurality of optical fiber cores included in the cable according to claim 1;
a measurement unit that performs measurement regarding backscattered light that is generated corresponding to each of beams of the test light and that is output from the one end of each of the plurality of optical fiber cores; and
an arithmetic unit that calculates a strain of each of the plurality of optical fiber cores based on a result of the measurement regarding each of beams of the backscattered light in the measurement unit and that calculates a shape of the cable based on each of the calculated strains.

17. The cable shape sensing system according to claim 16,
wherein each of the beams of the backscattered light is Rayleigh scattered light, and
the cable shape sensing system is configured to calculate the strain of each of the plurality of optical fiber cores by using optical frequency domain reflectometry.

18. The cable shape sensing system according to claim 16,
wherein each of the beams of the backscattered light is Brillouin scattered light, and the system is configured to calculate the strain of each of the plurality of optical fiber cores based on a result of measurement regarding the Brillouin scattered light.

19. The cable shape sensing system according to claim 16, wherein the cable shape sensing system is configured to obtain a temperature profile in the longitudinal direction of the cable based on the result of the measurement of the backscattered light from at least one of the optical fiber cores and correct the calculated strain of each of the plurality of optical fiber cores based on the temperature profile.

20. The cable shape sensing system according claim 16, further comprising
an optical device that causes each of beams of the test light to be input to each of the plurality of optical fiber cores in the cable and that causes each of the beams of the backscattered light output from each of the plurality of optical fiber cores to be output to the measurement unit.

21. The cable shape sensing system according to claim 20, further comprising:
a test light transmission line that transmits the test light to the optical device; and
a backscattered light transmission line that is separate from the test light transmission line and that transmits each of the beams of the backscattered light from the optical device to the measurement unit.

22. A sensing system comprising:
a cable including a plurality of optical fiber cores, and one or more optical fiber core wires including one or more of the optical fiber cores; and
the cable shape sensing system according to claim 16,
wherein at least one of the optical fiber core wires is fixed at a plurality of positions in a longitudinal direction of the cable so as to achieve substantially no displacement in a cable radial direction, the cable is formed of a plurality of structural materials including a transmission line, and the optical fiber core wire is fixed, at a plurality of positions in the longitudinal direction, to at least one of the plurality of structural materials, and
wherein the cable shape sensing system is configured to sense a position or a shape of a measurement target object located on a tip end side of the cable, opposite to an end to which the test light is input.

23. A sensing system comprising:
a cable including a plurality of optical fiber cores, and one or more optical fiber core wires including one or more of the optical fiber cores; and
the cable shape sensing system according to claim 16,
wherein at least one of the optical fiber core wires is fixed at a plurality of positions in a longitudinal direction of the cable so as to achieve substantially no displacement in a cable radial direction, the cable is formed of a plurality of structural materials including a transmission line, and the optical fiber core wire is fixed, at a plurality of positions in the longitudinal direction, to at least one of the plurality of structural materials, and
wherein the cable shape sensing system is configured to sense a shape of a measurement target object to which the cable is installed.

24. A cable shape sensing method comprising:
a step of inputting test light to one end of each of the plurality of optical fiber cores included in the cable according to claim 1;
a step of performing measurement regarding backscattered light that is generated corresponding to each of beams of the test light and that is output from the one end of each of the plurality of optical fiber cores; and
a step of calculating a strain of each of the plurality of optical fiber cores based on a result of the measurement regarding each of the beams of the backscattered light and calculating a shape of the cable based on each of the calculated strains.

* * * * *